Figures 1, 2:
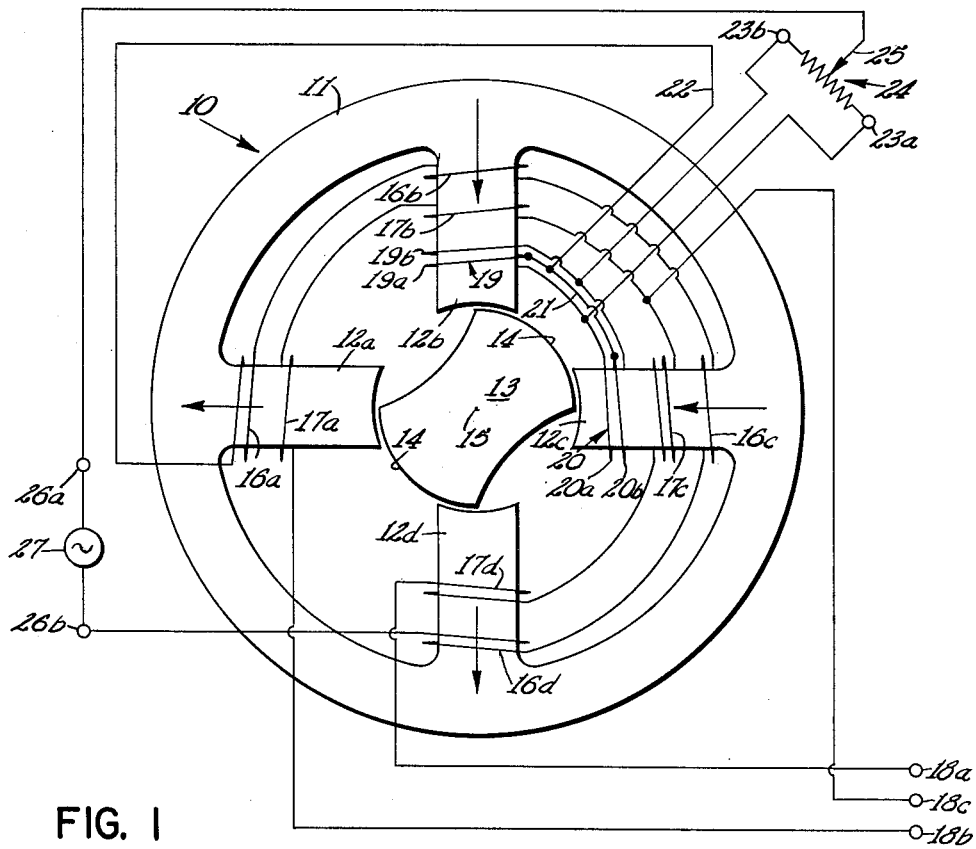

April 9, 1963 T. C. MAIER 3,085,192
VARIABLE OUTPUT TRANSFORMER
Filed March 10, 1960 2 Sheets-Sheet 1

INVENTOR.
THEODORE C. MAIER

April 9, 1963 T. C. MAIER 3,085,192
VARIABLE OUTPUT TRANSFORMER
Filed March 10, 1960 2 Sheets-Sheet 2

INVENTOR.
THEODORE C. MAIER

United States Patent Office 3,085,192
Patented Apr. 9, 1963

3,085,192
VARIABLE OUTPUT TRANSFORMER
Theodore C. Maier, Los Angeles, Calif., assignor to
Tamar Electronics Industries, Inc.
Filed Mar. 10, 1960, Ser. No. 14,135
3 Claims. (Cl. 323—51)

This invention relates to electromagnetic devices of the transformer type and more particularly to such devices capable of producing a variable output and known generally by those knowledgeable in the art as "pickoffs."

One type of pickoff to which the present invention has particular application is known as a microsyn, however, the principles of the invention are not limited thereto. This type of device comprises, as is well known in the electrical art, a multipole stator which has wound on the various poles a primary winding for producing a magnetomotive force pattern in the stator, and a secondary winding for producing an output voltage. An armature movable with respect to the stator poles is also provided which changes the flux distribution pattern in the various stator poles when the armature is moved. The secondary coils around the various stator poles are so arranged that when the armature is in its null position, the flux passing through the various stator poles is evenly distributed and the in phase potential from the secondary terminals is therefore zero. When, however, the armature is moved in either direction from the null position, a redistribution of the flux in the stator poles is effected and results in the generation of a secondary output voltage which is proportional to the angular displacement of the armature from the null position.

There are a number of applications employing pickoffs of the general type described in which it would be highly desirable for various reasons to be able to establish a null position at any one of a number of points of the armature setting rather than being restricted to the permanent null position incorporated in the particular pickoff. One example of such an application is in the case of a pickoff used in rate gyroscopes in which case the pickoff null point and the gimbal position of the gyro for zero rate must coincide. This coincidence is conventionally achieved by means of rather delicate and time consuming adjustment. It would be highly desirable to be able to eliminate this adjustment and, in addition, after sealing the gyro, to be able to correct any misalignment between the pickoff and the gimbal which might exist.

Accordingly, one of the objects of this invention is to provide a novel variable output transformer device which can be made to null when the movable member is in a position different from the position in which the null is normally produced.

Another object is to provide means for eliminating the necessity for mechanical adjustments in order to produce coincidence between the null position of a pick-off and a mechanical coupling attached thereto.

One of the features of the invention is the rapid, convenient and easy manner with which any necessary alignment, adjustments, etc., between a pickoff and a mechanical member attached thereto can be effected by reason of the novel electrical null shifting arrangement herein described.

Figure 3:
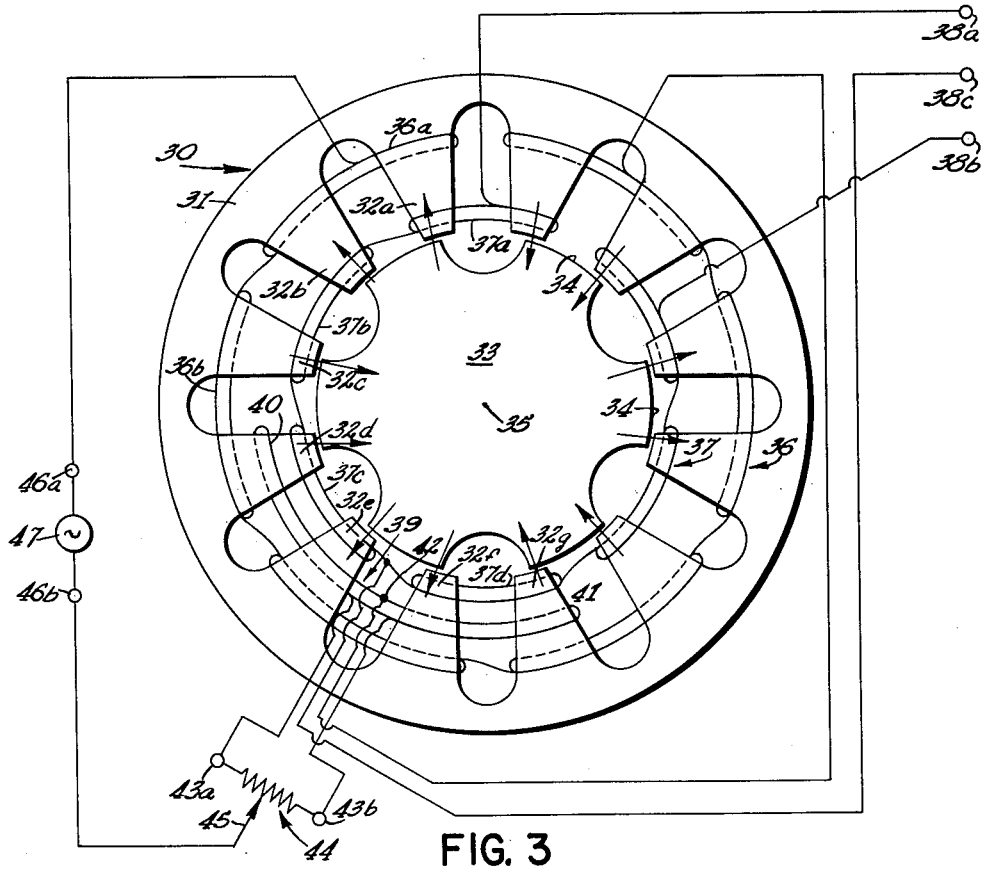
Figure 4:
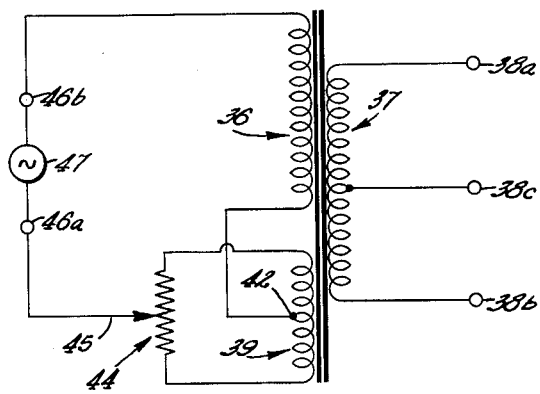

These and other objects, features and advantages will become apparent from a reading of the specification taken in conjunction with the drawings in which:

FIGURE 1 shows a pickoff device which broadly illustrates the principles of my invention, FIGURE 2 is a schematic wiring diagram showing the detailed hookup arrangement of the various coils in the device of FIG. 1, FIGURE 3 illustrates the principles of my invention applied to a modified construction of the pickoff device shown in FIG. 1, FIGURE 4 is a schematic wiring diagram of the detailed hookup arrangement employed in FIG. 3.

In accordance with the invention, there is provided a stator having a plurality of poles and an armature movable with respect thereto. A primary winding is wound about the various poles in such a manner as to produce a magnetomotive force pattern in the stator in which the forces are directed alternately inwardly and then outwardly in adjacent pairs of poles. A secondary winding is also wound about the various stator poles for producing an output voltage in accordance with the position of the armature.

In addition, there is also provided a third or null winding about one or more of the stator pole pieces which is divided in half by a center tap which is connected to one end of the primary winding. A potentiometer is connected across the null winding, the end terminals of the potentiometer being connected to the ends of the winding. The arrangement results in a circuit in which the primary and null windings and the potentiometer are in series relationship. The circuit thus produced is connected to an A.C. source, the free end of the primary being connected to one terminal of the source and the potentiometer wiper being connected to the other terminal.

When the potentiometer wiper is in the mid-position, the current through both halves of the null coil is equal and these currents produce opposing flux fields which cancel each other. When the potentiometer arm is in this position, the pickoff will null in its usual position.

As the potentiometer wiper is moved in a given direction away from the mid-position, however, unequal currents flow in the two halves of the null coil, and a net flux is produced which induces an output voltage in the secondary circuit. This output voltage may be bucked out by a normal secondary opposing voltage produced by shifting the armature to an appropriate new position which becomes the new null position of the armature.

By moving the potentiometer wiper in the opposite direction from the mid-position, a new null point will be produced by moving the armature in a direction opposite to that just described.

Referring to the device shown in FIG. 1, the numeral 10 indicates a stator having a generally cylindrical shaped outer portion 11 from which extend inwardly four symmetrically disposed poles 12a, 12b, 12c and 12d. An armature 13 having opposed arcuate end surfaces 14 is adapted to rotate about an axis 15 which is also the axis of the cylindrical portion 11 of the stator. Both the stator and armature are preferably constructed of laminations of magnetic material such as, for example, soft iron.

A primary winding designated generally by the numeral 16 (see both FIGS. 1 and 2) is provided on the stator and comprises winding portions 16a to 16d wound around each of the pole pieces 12a to 12d respectively. The portions of this winding around the various stator poles are so wound as to produce a magnetomotive force pattern in which the forces have a radially inward direction in two adjacent poles and a radially outward direction in the next two adjacent poles. Accordingly, the flux lines have an inward direction in the poles 12b and 12c and an outward direction in poles 12a and 12d, as shown by the radially disposed arrows associated with each pole. A secondary winding designated generally by the numeral 17 is also provided on the stator and comprises winding portions 17a to 17d wound about each of the pole pieces 12a to 12d and terminates in a pair of output terminals 18a, 18b, with a center tap 18c which is connected to the mid-point of the secondary winding.

A third or null winding is also provided and is shown in FIGS. 1 and 2 as comprising a pair of coils 19 and 20 connected in parallel with each other, the coil 19 being wound about stator pole 12b and the coil 20 being wound about stator pole 12c. Each of these coils must be wound in either the same direction as the secondary winding portion with which it is associated or in the opposite direction. Additionally, the coils must have the same number of turns in order to maintain balance between the center tap 18c and each terminal 18a, 18b, since one coil 19 is associated with one half of the secondary and one coil 20 is associated with the other half. Further, each coil 19, 20 is center tapped, thus defining two halves 19a, 19b and 20a, 20b, respectively. These two center taps are connected together by a wire 21 which is in turn connected by a wire 22 to one end of the primary winding 16. The ends of the two null coils 19 and 20 are connected to terminals 23a and 23b of a potentiometer 24. The wiper 25 of this potentiometer is connected through a terminal 26a to a suitable source of alternating current 27. The path of current from the source 27 will therefore be through the terminal 26a, the potentiometer slider 25, the potentiometer 24, each of the null coils 19 and 20, the wires 21 and 22, the various primary portions 16a to 16d, and through the terminal 26b to the current source 27.

As is well known by those knowledgeable in the art to which this invention pertains, when the armature of a conventional pickoff (i.e. one as shown in FIG. 1 but without the null windings 19 and 20) is in the position shown in FIG. 1 the flux distribution through each pole is equal, and the potentials induced in the various secondary windings cancel each other with the result that the in phase component between the output terminals 18a, 18b is for all practical purposes zero. Thus, under these conditions, it is said that the armature is in the null position.

The presence of the null winding arrangement shown in FIGS. 1 and 2 will not alter this null condition when the potentiometer slider 25 is set to the mid-position. The reason for this is that when the potentiometer slider is at its mid-position, the current distribution through each half 19a, 19b and 20a and 20b of the null coils 19 and 20, respectively is equal, and no net flux is produced since the flux from each coil half cancels that from the other coil half. Accordingly, no flux from the null coil links any turns of the secondary winding portion and thus there is no in phase outout voltage produced across the output terminals 18a, 18b.

When, however, the potentiometer wiper 25 is moved in the direction of the potentiometer terminal 23a, more current passes through the null winding halves 19a and 20a and less through the halves 19b and 20b. As a result, unequal amounts of flux are generated by the different halves of each null coil, resulting in incomplete flux cancellation in each pole. The net flux remaining links the secondary coils associated with the null coils thus inducing a potential in the secondary winding which in turn results in a measurable signal output at the terminals 18. The armature 13 can then be located clockwise or counterclockwise as required to redistribute the flux in the various stator poles and thus produce a potential in the secondary winding which will be equal and opposite to the potential developed by the net flux produced by the null coils 19 and 20. The result is that a null output is now produced at the terminals 18 at a new position of the armature which is angularly displaced from the position in which a null was produced with the potentiometer slider 25 at its mid-position. The angular displacement necessary to produce a new null at the output terminals will be dependent upon the current differential between the two halves of each of the null windings and also dependent therefore upon the distance of the potentiometer slider 25 from its mid-position.

It should be observed that if it is not necessary to have a balanced output at the terminals 18 in FIGS. 1 and 2 that either of the null coils 19 or 20 could be eliminated. In such case, the remaining coil could be placed on any of the four poles, so long as the net flux produced thereby will link the secondary winding portion with which it is associated.

FIG. 3 shows a modification of the general type of variable output transformer or pickoff shown in FIG. 1. The numeral 30 indicates a stator having a generally cylindrical shaped outer portion 31 similar to FIG. 1 and from which extend inwardly twelve symmetrically disposed pole pieces only seven of which, 32a to 32g, are numbered for purposes of clarity. An armature 33 having lobes with arcute end surfaces 34 bridge adjacent pairs of stator poles and is adapted to rotate about an axis 35 which is also the axis of the cylindrical portion 31 of the stator. As in the device of FIG. 1 some suitable laminated magnetic material such as soft iron is preferred for the construction of the rotor and stator.

The primary winding for the structure of FIG. 3 is designated generally by the numeral 36 (see both FIGS. 3 and 4) and comprises winding portions wound around consecutive adjacent pairs of poles beginning with pole pairs 32a and 32b, pair 32c and 32d, etc., in such a manner as to produce a magnetomotive force pattern having the same direction in adjacent poles encompassed by the same winding portion. Accordingly, the two poles 32a and 32b encompassed by the first primary winding portion 35a have flux lines which are disposed radially outward, poles 32c and 32d have flux lines which are disposed radially inward, etc.

A secondary winding designated generally by the numeral 37 is also provided and as in the case with the primary winding 35 is adapted to encircle pairs of adjacent poles. The pole pairs encircled by the secondary winding portions, however, are not the same pole pairs which are encircled by the primary winding portions. Rather, only one pole of the pair which is encircled by any given primary winding portion is encircled by a secondary winding portion, the other pole being encircled by the adjacent secondary winding portion. Accordingly, whereas primary winding portion 35a encircles stator poles 32a and 32b and portion 35b encircles 32c and 32d, the poles of these two pairs that are encircled by a single secondary winding portion are 32b and 32c. This primary-secondary dual pole pattern is repeated around the various poles of the stator. A balanced output voltage from the secondary winding will appear between each of the output terminals 38a, 38b and the terminal 38c, this latter terminal being connected to a center tap on the secondary.

The null winding 39 in FIG. 3, in contrast to that of FIG. 1, is wound about two pairs of poles, namely pair 32d, 32e and pair 32f, 32g. It is important that the portions 40 and 41 of this winding encompass the same poles encompassed by the secondary winding portions 37c and 37d with which they are respectively associated. Further, for proper operation, since the secondary winding portions 37c and 37d are wound in opposite directions, the null winding portions 40 and 41 must also be wound in this figure 8 pattern. Also, as in FIG. 1, since the secondary is center-tapped, the null winding portions 40 and 41 should be equal so that their effect on each half of the secondary with which they are associated will be the same.

A center tap 42 is provided on the null winding 39 and is connected by a wire to one end of the primary 36. The ends of the null winding 39 are connected as in the case of FIG. 1 to end terminals 43a and 43b of a potentiometer 44. The wiper 45 of the potentiometer is connected in similar manner as in FIG. 1 through a terminal 46a to a suitable source of alternating current 47. The path of current from the source will therefore be through the terminal 46a, the various portions of the primary 35, the null coil 39, the potentiometer 44, the potentiometer slider 45 and through the terminal 46b to the current source 47.

The manner of operation of the device shown in FIG. 3 is very similar to that of the device shown in FIG. 1. Accordingly, assuming the potentiometer wiper 45 to be in the mid-position, the pickoff will produce a null when the rotor 33 is in the position shown. When, however, the wiper is moved in either direction from its mid-position, a greater current will flow in either of the null winding portions 40 or 41 and accordingly, the flux distribution pattern in the stator poles will be altered resulting in a potential being induced in the secondary. As in the case of the device of FIG. 1, this voltage can be bucked out or neutralized by rotating the rotor 33 in an appropriate direction to redistribute the flux in the stator poles and thus develop an opposing signal in the secondary. Accordingly, this new position of the rotor will be the new null position. Again, as in FIG. 1, a new null position will exist on each side of the null position corresponding to the mid-position of the wiper 45, the direction of rotor rotation depending upon the direction of movement of the wiper 45 from its mid-position.

It should be noted that, as in the device of FIG. 1, either the null winding portion 40 or 41 could be eliminated if a balanced output from the secondary is not required. It will also be observed that the device of FIG. 1 has four stator poles and the device of FIG. 3 has twelve. The principles of the invention described herein are applicable not only to the specific pickoff devices described but also to others having a number of poles which are a multiple of four, and to other devices of similar construction.

Since many changes could be made in the above construction and many apparently widely different embodiments of this invention could be made without departing from the scope thereof, it is intended that all matter conained in the above description or shown in the accompanying drawings shall be interpreted as illustrative and not in a limiting sense.

What is claimed is:

1. A variable output transformer comprising a stator having four $n$ symmetrically disposed poles, $n$ being any whole number greater than zero, a member of magnetic material movable with respect to said stator and having a null position with respect to said poles, a first winding associated with each of said poles for producing a magnetomotive force pattern in said stator in which the forces are directed alternately inwardly and outwardly in adjacent pairs of poles, a second winding associated with said poles for producing an output voltage in accordance with the position of said movable member, a third winding associated with at least one of said poles for varying the flux pattern in said stator, said third winding having a center tap, and a potentiometer having its ends connected to the ends of said third winding for simultaneously applying variable current values to each half of said third winding.

2. Apparatus as recited in claim 1 wherein one end of said first winding is connected to said center tap, and a source of A.-C. potential, said source being connected between the other end of said first winding and the movable element of said potentiometer.

3. A variable output transformer comprising a stator having four $n$ symmetrically disposed poles, $n$ being any whole number greater than zero, a member of magnetic material movable with respect to said stator and having a null position with respect to said poles, a first winding associated with each of said poles for producing a magnetomotive force pattern in said stator in which the forces are directed alternately inwardly and outwardly in adjacent pairs of poles, a second winding having a center tap and being associated with said poles for producing an output voltage in accordance with the position of said movable member, and a null winding associated with each of a pair of adjacent poles in which the forces of said magnetomotive force patterns are directed in the same direction, each of said null windings having a center tap connection and having their ends and center tap connections connected together so that one null winding is connected in shunt relationship with the other null winding, a potentiometer having its ends connected to the ends of said null windings, one end of said first winding being connected to said center tap connections, and a source of A.-C. potential, said source being connected between the other end of said first winding and the movable element of said potentiometer.

References Cited in the file of this patent
UNITED STATES PATENTS
2,882,484     Swainson _____ Apr. 14, 1959